United States Patent [19]

Britsch et al.

[11] Patent Number: 4,542,727
[45] Date of Patent: Sep. 24, 1985

[54] INTERNAL COMBUSTION ENGINE OPERATING CONTROL SYSTEM AND METHOD

[75] Inventors: Heinz Britsch, Bietigheim; Martin Klenk, Backnang; Ernst Linder, Mühlacker; Winfried Moser, Markgröningen, all of Fed. Rep. of Germany

[73] Assignee: Robert Bosch GmbH, Stuttgart, Fed. Rep. of Germany

[21] Appl. No.: 419,933

[22] Filed: Sep. 20, 1982

[30] Foreign Application Priority Data

Oct. 28, 1981 [DE] Fed. Rep. of Germany ....... 3142729

[51] Int. Cl.[4] .............................................. F02D 37/00
[52] U.S. Cl. ..................................... 123/435; 123/425
[58] Field of Search ................ 123/425, 435, 419, 436, 123/198 A

[56] References Cited

U.S. PATENT DOCUMENTS

| | | | |
|---|---|---|---|
| 2,220,558 | 11/1940 | Van Dijck et al. ................. | 123/425 |
| 4,002,155 | 1/1977 | Harned et al. ....................... | 123/425 |
| 4,012,942 | 3/1977 | Harned ................................. | 123/425 |
| 4,133,475 | 1/1979 | Harned et al. ....................... | 123/425 |
| 4,153,020 | 5/1979 | King et al. ........................... | 123/425 |
| 4,322,948 | 4/1982 | Emmenthal et al. ................ | 60/602 |
| 4,364,353 | 12/1982 | Fiala ..................................... | 123/435 |
| 4,417,556 | 11/1983 | Latsch ................................. | 123/435 |

FOREIGN PATENT DOCUMENTS 3009046 9/1981 Fed. Rep. of Germany .
2001130 2/1982 United Kingdom .

Primary Examiner—Andrew M. Dolinar
Attorney, Agent, or Firm—Frishauf, Holtz, Goodman & Woodward

[57] ABSTRACT

To modify engine operation and reduce the tendency of the engine to knock or ping, a knocking signal is generated which is representative of knocking intensity and/or frequency of knocking occurrence, and compared with a permissible knocking signal. The result of the comparison is utilized to change an operating parameter of the engine, for example by injecting a fluid, e.g. water, into the engine, changing charge pressure, for example of a turbocharger or the like. The permissible engine knock signal can be modified in accordance with an engine operating parameter, for example at low temperature, or low speed, the permissible knocking limit can be raised since the damaging effect of knocking at low temperature or low speed is less than under different operating conditions.

15 Claims, 1 Drawing Figure

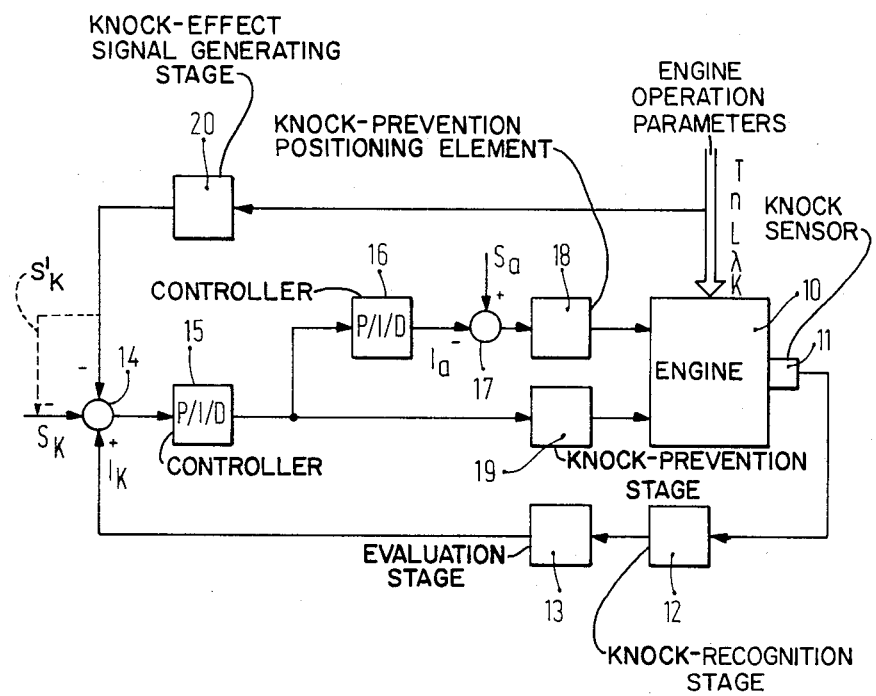

INTERNAL COMBUSTION ENGINE OPERATING CONTROL SYSTEM AND METHOD

REFERENCED TO PRIOR PATENTS

U.S. Pat. No. 4,002,155, Harned et al; U.S. Pat. No. 4,133,475, Harned et al; U.S. Pat. No. 4,153,020, King et al; British Pat. No. 2,001,130, Scherenberg; and, assigned to the Assignee of this application: German Patent Disclosure Document DE-OS No. 30 09 046, Schramm.

The present invention relates to a system and method to control the operation of an internal combustion (IC) engine which is equipped with knock sensors to sense combustion conditions resulting in knocking or pinging of the engine, and which includes signal processors to receive the signals from the knock sensor, to then control the engine operation to prevent knocking or pinging.

BACKGROUND

Various types of knocking or pinging prevention and control systems have been proposed—see the referenced patents and patent documents listed above. The systems, as proposed, control operation of the engine by adjusting the position of an operating control element thereof if an evaluation circuit, connected to a knock sensor, senses that the engine is operating under knocking conditions, or has a tendency to knock. Typical changes to prevent knocking of the engine are: changing the fuel-air ratio to provide a somewhat richer mixture, that is, one which has more fuel therein; providing additives to the fuel-air mixture to insure operation without knocking, by increasing the resistance to knocking of the engine. Typical additives are water, alcohols, aniline compounds, lead, or similar metallic compounds, as well as combinations thereof. Other changes which can be made are changes in the extent of exhaust gas recirculation (EGR), by controlling the gas being returned in a return loop; controlling the temperature of the air which is charged into the engine, for example by heating or cooling the intake air; controlling the temperature of the combustion mixture or the combustion components thereof, controlling the cooling of the engine, and, most importantly, controlling ignition timing and/or fuel injection timing in a fuel injected engine. An additional change suitable for turbocharged engines is to change the turbo charging pressure. Readily changed parameters are the introduction of additives, for example by injecting components which have a tendency to decrease knocking, and to control the charge pressure of induction air, for example the charge pressure of a turbocharger.

The various steps taken to decrease knocking can be carried out in dependence on actual sensing of knocking, and especially by counting the sequence and the number of knocking events, and the intensity thereof, which occur—see, for example, the referenced U.S. Pat. No. 4,153,020, King et al. Knock control systems are subject to the problem that, if the knocking is slight, or occurs only from time to time, the control loop may overreact. Such overreaction can be avoided by making the control loop operate slowly. Yet, slow operation of the control loop prevents rapid reaction to substantial knocking which suddenly occurs.

THE INVENTION

It is an object to improve the control effects of a control loop which reacts to knocking of the engine to provide smooth response which, however, is rapid.

Briefly, in accordance with the invention, knocking signals are generated by knock sensors or the like, and distinguished from engine noise signals. A standard, or permissible knock signal is generated which is compared in a comparator, receiving the actual knocking condition signals, as well as the permissible signals and providing a control output signal to the engine control to change the operating conditions of the engine in a non-knocking operating direction if the comparison by the comparator exceeds a predetermined or preset value.

The particular change of engine control can be selected in accordance with design requirements to change a suitable engine parameter which affects knocking, as discussed above. The comparison can be carried out with respect to frequency of occurrence of knocking events, and/or intensity thereof, or a combination of both. If the knocking recognition system is sensitive, so that even under normal operating conditions, unusual combustion events or irregular combustion is recognized, a suitable value can then be commanded to respond to a predetermined number of sensed knocking events, so that the operating conditions of the engine can be controlled into the non-knocking region before actual knocking occurred, that is, as soon as a tendency to knocking operation has been recognized.

The system has the advantage that, by providing a standard, or permissible knocking signal, a certain degree of tendency to knocking can be permitted, so that, if only occasional, or very weak knocking events occur, the system need not react at all, and will not react; yet, at heavy knocking operation, the system will react rapidly. This provides for overall smoother engine operation, yet rapid control upon deviation from normal operation, so that overall deviation from an optimum operating point is reduced.

In accordance with a particularly desirable feature of the invention, the standard or permissible knocking signal can be changed in relation to engine parameters, or may have a modifying signal, for example representative of interference signals applied thereto. The permissible knocking signal, thus, can permit knocking operation for a larger number of sequential knocking events than otherwise, with the number being selected in accordance with design of the engine, which may permit several knocking events to occur without damage to the engine under certain engine operating conditions, for example at low engine speed or low engine, or ambient temperature.

In accordance with a particularly preferred feature of the invention, an adding circuit is included in the system which, in dependence on a control signal value, changes one operating parameter of the engine with long-time effective changes in a direction to reduce knocking combustion; a second parameter adjusting element is also provided and controlled, the second element having a short-time effect, and introducing, for example, rapidly acting changes which, however, do not persist over a long period of time. One such change is, for example, injection of water to the IC engine which will rapidly reduce knocking, but will not have a persistent effect.

DRAWINGS

The single FIGURE is a schematic block diagram of a combustion control system, operating in accordance with the method for an internal combustion engine.

DETAILED DESCRIPTION

An internal combustion (IC) engine 10 has a knock sensor 11 associated therewith in order to recognize combustion conditions which result in knocking or pinging. The output signal from the knock sensor is applied to an evaluation circuit 12 in order to filter out and remove the noise signals, so that the actual knocking signals can be distinguished from the number of pulses and frequencies which are mixed in with the signal derived from the sensor 11. Usual knock sensors sense more than actual knocking or pinging signals, and it is necessary to distinguish the knocking or pinging signals from overall engine noises.

The knocking signals recognized in the knocking recognition stage 12 are applied to an evaluation stage 13 in which the knocking signals are evaluated and provide an output signal which has certain characteristics in dependence on, for example, the frequency of occurrence of knocking signals, the intensity of the knocking signals, or a combination of both. The evaluation stage 13 thus provides an output signal evaluating the combustion events as sent by the knocking sensor, with respect to frequency of occurrence of unusual combustion conditions or the intensity thereof, or a combination, to provide an output signal representative of the respective selected parameter, or combination. Knocking recognition stages and evaluation stages are well known, and reference is made to the aforementioned patents and literature.

The output from the evaluation stage is an actual signal $I_K$. This actual knocking value signal $I_K$ is compared in a comparator 14 with a reference, or permissive knocking signal $S_K$. The comparator 14, in its simplest form, may be an algebraic adder, which has positive and negative inputs. The output from the comparator 14, and representative of control deviation, is applied to a controller 15, the output of which is connected to a second comparator 17 which, again, may be an algebraic adder, for application to a knock prevention positioning element 18. The second comparator or algebraic adder 17 combines the output from the controller 15 with a desired value of a working point, represented by a signal Sa. Such a desired value of the working point, for example, may relate a specific working point or event of the IC engine to a predetermined value. For example, a suitable working point may be a predetermined ignition timing instant, or a predetermined charge pressure, derived, for example, from a turbocharger. The particular working point can be derived by manually setting a suitable control element, by inherent engine adjustment of a control element, for example by setting of engine vacuum, or in form of a signal derived from an engine operating computer which provides the respective predetermined parameter in dependence on engine operating and operation characteristics, stored in the form of characteristic curves within the engine operating computer in memory elements, for example programmable read-only memories (PROMs). Such engine operating computers are well known and in commercial use. The control deviation required to reduce pinging or knocking is applied to a first knock prevention positioning element 18, which controls the setting or timing of one of the parameters affecting engine operation.

The output of the controller 15 is additionally connected to a second knock prevention positioning element 19, which affects another parameter of operation of the engine. The controllers 15,16 may operate in accordance with any desired control algorithms, and have proportional and/or integral, and/or differential control characteristics.

To distinguish between the positioning elements 18 and 19, the positioning element 19 may also be termed a knock prevention stage.

The operation of the IC engine will depend on the applied engine operating parameters, for example temperature T, speed n, loading L, air number λ, type of fuel K, and the like. The engine operating parameters are applied singly or in combination to a knock-effect signal generating stage 20, as well as to the engine 10. The knock-effect signal generating stage 20 receives the respective engine parameters and provides, in accordance with engine operating characteristics stored, for example, in PROMs, a modifying signal, $S'_K$, which has, in dependence on the particular parameter, certain influence on the operation of the engine, the stage 20 being controllable so that a desired influence in dependence on change of the various parameters can be provided in form of an output signal therefrom. The output signal can be applied directly to the comparator 14 as an additional comparison input to modify the comparison level of the comparator 14 with respect to the permissible knocking signal $S_K$, or can be applied to the permissible knocking signal $S_K$ to modify it before comparison, as schematically illustrated by the broken line $S'_K$, or a combination of both direct and modifying connection may be made.

The output signal applied by the stage 20 thus changes the permissible knocking signal $S_K$ in dependence on the desired parameter which is to be influenced. For example, the parameter may be speed, and at low speed of the engine, or at low temperature, the value $S_K$, that is, permissible knocking, can be increased since under low temperature or low-speed conditions, knocking or pinging operation is relatively harmless to the engine. Similarly, changes of the permissible knocking or pinging signal $S_K$ can be made in dependence on other engine parameters, selected in relation to the respective harm which can result to the engine if knocking or pinging persists under the respective conditions.

OPERATION

Basically, the method and system compares sensed and evaluated combustion conditions in the comparator 14 with a permissible value which provides a signal representative of a permissible degree of knocking or pinging events, and which, preferably, is changeable in dependence on then pertaining engine operating conditions, for example speed or temperature. A permissible value may be, for example, one pinging or knocking combustion event during sixteen combustion events in a specific cylinder; another permissible value may be a certain intensity of knocking combustion.

If the frequency of occurrence of knocking events is sensed, then the evaluation stage 13 can be constructed as an average value circuit, which provides, in dependence on frequency of occurrence, a digital or analog signal to the comparator 14. If the comparator 14 determines that the permissible value $S_K$ is exceeded, the controller 15 will cause the knock prevention stage 19 to provide for rapid change of operating conditions of the IC engine to prevent pinging or knocking. One example would be the injection of water, or other substances which have the tendency to reduce knocking into the IC engine. The advantage of injecting water is that the ignition timing of the engine then need not be changed, and can be operated under optimum conditions, both with respect to fuel consumption and power output; as known, injection of water in certain operating ranges, provides for increased power output.

The water injection by the knock prevention stage 19 is operated in parallel with a quasi-stationary controller. For example, if the engine is turbocharged, the charge pressure can be controlled by the knock prevention positioning element 18. The optimum charge pressure is introduced in form of the signal $S_a$; under ordinary, non-knocking operation, the optimum charge pressure is used. If knocking or pinging should result, as evaluated by the evaluation stage with respect to intensity and/or frequency of occurrence of knocking or pinging events, resulting in an output signal $I_a$, charge pressure is changed so that the knock prevention stage 19 need not continue to inject water and thus introduce an excessive amount into the engine, which may lead later on to rusting.

In the simplest arrangement, the controller 16, positioning element 18, and comparator 17 can be omitted, and only a single knock prevention stage 19 is required. The influencing of a selected knock preventing engine operating parameter by the stage 19 can then be controlled directly from controller 15; in yet another alternative, the stage 19 is omitted and only the control path through elements 16,17,18 need be used.

Utilizing two parameter control positioning elements 18,19 has the advantage that a substantial number of combinations of the various methods to reduce knocking can be used. If, for example, as illustrated, two parameters are controlled, one immediately and quickly effective, and one more slowly effective but persistent, then it is desirable to so arrange the controller 16 that it operates, generally, slower than the controller 15, and to provide the controller 16 with a dead zone or dead band, so that rapid changes in the knock sensing signal derived from the evaluation stage 13 can be controlled by the rapidly acting knock prevention stage 19, for example by injection of water, whereas somewhat more stationary or slowly changing conditions in the operating level are controlled over the positioning element 18, for example by changing induction air pressure, charging pressure, or the like.

Various changes and possible arrangements thereof can be used with any of the others.

We claim:

1. Internal combustion engine (10) operating control system comprising
   combustion sensor means (11) for sensing knocking combustion conditions;
   signal processing means (12,13) receiving signals from the knock sensing means representative of knocking combustion conditions and other engine combustion operating conditions, and providing a knock condition signal;
   engine control means (18,19) having parameter adjusting elements for controlling a plurality of operating conditions of the engine, and capable of changing the operating conditions thereof in the manner to reduce the tendency to knock, or to inhibit knocking;
   means for generating a permissible knock signal ($S_K$);
   a comparator stage (14) receiving the knock condition signal ($I_K$) as an actual operating condition signal and the permissible knock signal ($S_K$) for comparison, and to provide a control output signal to the engine in the direction of non-knocking operation if the comparison by said comparator stage (14) exceeds a permissible value; and
   a control circuit (15, 16, 17) connected to receive said control output signal from the comparator stage (14) and controlling the engine control means (18,19) for simultaneously actuating a second parameter adjusting element (19) having a rapid effect on engine operation lasting for only a few combustion cycles and a first parameter adjusting element (18) having a more slowly effective effect on engine operation lasting for a greater number of combustion cycles, said circuit including
   a first controller means (15) connected to the comparator (14), and providing an output signal having a first adjustment value which is a function of an input signal received from said comparator (14) and which is applied to one of said parameter adjusting elements;
   a second controller (16,17) connected to said first controller (15) and providing an output signal having a second adjustment value which is a predetermined function of said first adjustment value which is applied thereto by said first controller (15), said second adjustment value signal being applied to the other parameter adjusting element.

2. System according to claim 1, including means (20) coupled to receive engine operating parameters and connected to modify the permissible knocking signal ($S_K$) as a function of at least one engine operating parameter.

3. System according to claim 2, wherein said modifying means comprises a knock-effect signal generating stage (20) connected to affect the comparison level of said comparator stage.

4. System according to claim 2, wherein said modifying means comprises a knock-effect signal generating stage providing an output signal ($S'_K$) connected to affect the permissible knock signal ($S_K$).

5. Internal combustion engine (10) operating control system comprising
   combustion sensor means (11) for sensing knocking combustion conditions;
   signal processing means (12,13) receiving signals from the knock sensing means representative of knocking combustion conditions and other engine combustion operating conditions, and providing a knock condition signal;
   engine control means (18,19) having parameter adjusting elements for controlling a plurality of operating conditions of the engine, and capable of changing the operating conditions thereof in the manner to reduce the tendency to knock, or to inhibit knocking;
   means for generating a permissible knock signal ($S_K$);
   a comparator stage (14) receiving the knock condition signal ($I_K$) as an actual operating condition signal and the permissible knock signal ($S_K$) for comparison, and providing a control output signal to the engine in the direction of non-knocking operation if the comparison by said comparator stage (14) exceeds a permissible value;

means (15, 16, 17) responsive to said control output signal for simultaneously actuating a second parameter adjusting element (19) having a rapid but temporary effect on engine operation and a first parameter adjusting element (18) having a more slowly effective but persistent effect on engine operation;

a control circuit (15,16,17) connected to receive the control output signal from the comparator stage (14) and controlling the engine control means (18,19), said circuit including a first controller (15) connected to the comparator stage (14), and providing an output signal which is a function of an input signal received from said comparator stage (14);

a second controller (16) connected to said first controller (15) and providing an output signal which is a predetermined function of an input signal applied thereto by said first controller (15); and a second comparator (17) receiving the output signal from the second controller (16) and a comparison input signal ($S_a$) representative of a desired operating condition of said first parameter adjusting element (18), the second comparator (17) controlling the operation of said first parameter adjusting element (18) in dependence on said desired input signal ($S_a$) and the output from the second controller (16).

6. System according to claim 5, wherein said desired operating condition is the value of a parameter selected from the group consisting of ignition timing, fuel injection timing, turbocharger charge pressure, fuel/air ratio, throttle setting, engine loading, engine speed, type of fuel, and intake air temperature.

7. System according to claim 6, wherein the engine includes a turbocharger and the first parameter adjusting element (18) comprises means to control the charge pressure thereof.

8. System according to claim 5, wherein the second parameter adjusting element (19) comprises means for injecting a fluid into the engine having the effect of reducing knocking operation.

9. Method of controlling operation of an internal combustion engine (10), said engine having knock sensing means (11) for sensing knocking combustion conditions;

signal processing means (12,13) receiving signals from the knock sensing means representative of knocking combustion conditions and providing a knock-condition signal ($I_K$); and engine control means (18,19) controlling a plurality of operating conditions of the engine and capable of changing the operating condition thereof in a manner which reduces the tendency of, or inhibits, knocking, said method comprising the steps of generating a permissible knocking signal ($S_K$);

comparing the permissible knocking signal with the knock-condition signal ($I_K$) and deriving a control output signal; and simultaneously initiating, in response to said output signal, a rapidly effective modification according to a signal having a first value effective for only a few combustion cycles and a slowly effective but persistent modification according to a signal having a second value which is determined in response to said first value of engine operating parameters, in the direction of non-knocking operation if the comparison step results in an output which deviates from a predetermined level.

10. Method according to claim 9, including the step of generating a knock-effect signal as a function of an engine operating parameter;

and modifying the permissible knocking signal ($S_K$) as a function of the generated knock-effect signal based on at least one selected engine operating parameter.

11. Method according to claim 9, wherein said rapidly effective step comprises injection of an engine operation modifying fluid into the engine.

12. Method according to claim 9, wherein said persistently effective modification step comprises changing engine air-fuel mixture charging characteristics.

13. Method according to claim 12, wherein said step of changing said charging characteristics comprises providing a predetermined charge characteristic representative of a predetermined operating condition ($S_a$);

and modifying said condition in dependence on the result of the comparison carried out during said comparison step.

14. Internal combustion engine (10) operating control system having combustion sensor means (11) for sensing knocking combustion conditions;

signal processing means (12,13) receiving signals from the knock sensing means representative of knocking combustion conditions and other engine combustion operating conditions, and providing a knock condition signal;

engine control means (18,19) having first (18) and second (19) parameter adjusting elements for controlling a plurality of operating conditions of the engine, and capable of changing the operating conditions thereof in the manner to reduce the tendency to knock, or to inhibit knocking once it starts, and comprising, in accordance with the invention, means for generating a permissible knock signal ($S_K$);

a comparator stage (14) receiving the knock condition signal ($I_K$) as an actual operating condition signal and the permissible knock signal ($S_K$) for comparison, and to provide a control output signal to the engine in the direction of non-knocking operation if the comparison by said comparator stage (14) exceeds a permissible value; and a control circuit (15,16,17) connected to receive the control output signal from the comparator stage (14) and controlling the engine control means (18,19), said circuit including a first controller (15) connected to the comparator stage (14), and providing an output signal having a first adjustment value which is a function of an input signal received from said comparator stage (14) and which is applied to one of said parameter adjusting elements;

a second controller (16) connected to said first controller (15) and providing an output signal having a second adjustment value which is a predetermined function of said first adjustment value which is applied thereto by said first controller (15); and a second comparator (17) receiving the output signal from the second controller (16) and a comparison input signal ($S_a$) representative of a desired operating condition of the other parameter adjusting element (18), the second comparator (17) controlling the operation of the other parameter adjusting element (18) in dependence on said desired input signal ($S_a$) and the output from the second controller (16).

15. Method of controlling operation of an internal combustion engine (10), said engine having
   knock sensing means (11) for sensing knocking combustion conditions;
   signal processing means (12,13) receiving signals from the knock sensing means representative of knocking combustion conditions and providing a knock-condition signal ($I_K$);
   control signal means (15,16,17) receiving and evaluating said knock-condition signal and producing signals for controlling said engine; and
   engine control means (18,19) having parameter adjustment elements responsive to said control signals for controlling a plurality of operating conditions of the engine and capable of changing the operating condition thereof in a manner which reduces the tendency of, or inhibits, knocking,
said method comprising the steps of
   generating a permissible knocking signal ($S_K$);
   comparing (14) the permissible knocking signal with the knock-condition signal ($I_K$) and deriving a first control output signal;
   deriving (15) an second control output signal which is a predetermined function of said first control signal;
   deriving (16) a third control output signal which is a predetermined function of said second control signal;
   combining (17) said third control signal ($I_a$) with a signal ($S_a$) representative of an optimum engine working point to determine the timing and degree of a particular knock-suppression step; and
   controlling one parameter adjustment element (19) by said second control output signal and another parameter adjustment element (18) by said combined signal in a direction to change the engine operating conditions of the engine in the direction of non-knocking operation, if the comparison step results in an output which deviates from a predetermined level.

* * * * *

UNITED STATES PATENT AND TRADEMARK OFFICE
CERTIFICATE OF CORRECTION

PATENT NO. : 4,542,727
DATED : September 24, 1985
INVENTOR(S) : Heinz BRITSCH et al It is certified that error appears in the above-identified patent and that said Letters Patent is hereby corrected as shown below:

Claim 1, column 6, line 26, change "a second controller (16,17)"
to read --a second controller means (16,17)--;

Claim 11, line 12, column 8, change "effective step" to
--effective modification step--.

Signed and Sealed this

Twenty-first Day of January 1986

[SEAL]

Attest:

DONALD J. QUIGG

Attesting Officer  Commissioner of Patents and Trademarks